(No Model.)

J. SCHUCHARD.
Rotary Spading Machine.

No. 238,532. Patented March 8, 1881.

Witnesses:

Julius Schuchard, Inventor,
By Paine, Grofton & Sadd,
Attorneys.

UNITED STATES PATENT OFFICE.

JULIUS SCHUCHARD, OF FREDERICKSBURG, TEXAS.

ROTARY SPADING-MACHINE.

SPECIFICATION forming part of Letters Patent No. 238,532, dated March 8, 1881.

Application filed December 13, 1880. (No model.)

*To all whom it may concern:*

Be it known that I, JULIUS SCHUCHARD, a citizen of the United States, residing at Fredericksburg, in the county of Gillespie and State of Texas, have invented certain new and useful Improvements in Rotary Spading-Machines; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The present invention relates to that class of machines for spading or plowing unbroken or hard ground in which a series of spades or forks are mounted on a revolving cylinder, so that the machine in traversing the soil will raise and turn over the same.

The invention consists in the combination of a cylinder or drum armed with a series of spades or teeth, and mounted on a revolving shaft having a bearing or ground wheel, and a series of cleaning fingers or disks, which operate between the teeth of a second cylinder or drum which is mounted in a frame hung loosely on the main shaft of the machine, so as to rise and fall and adapt itself to the inequalities of the ground. A series of cleaning fingers or disks are also combined with the spade-cylinder mounted on the shaft carrying the bearing or ground wheel; and the invention further consists in the peculiar form of the spades or teeth, as hereinafter described.

Figure 1:
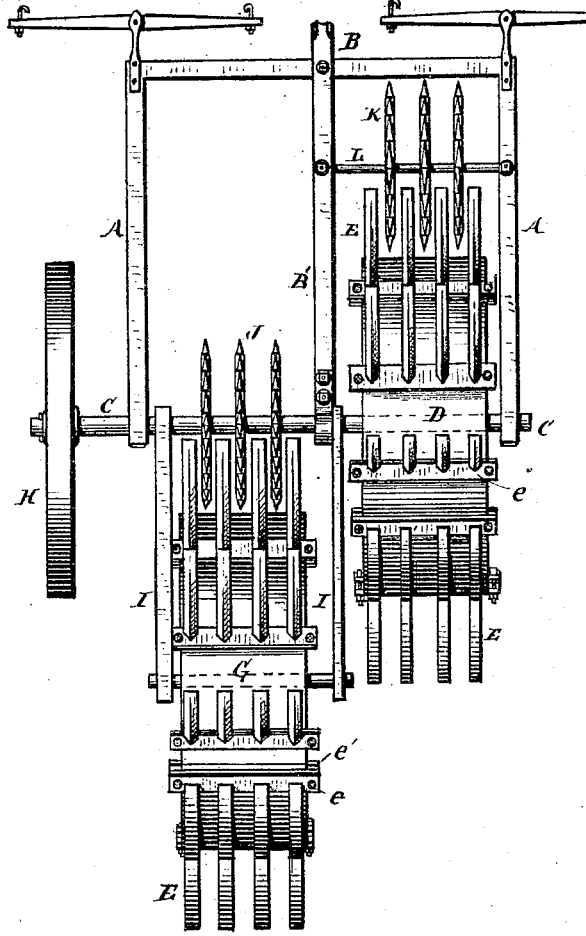
Figure 2:
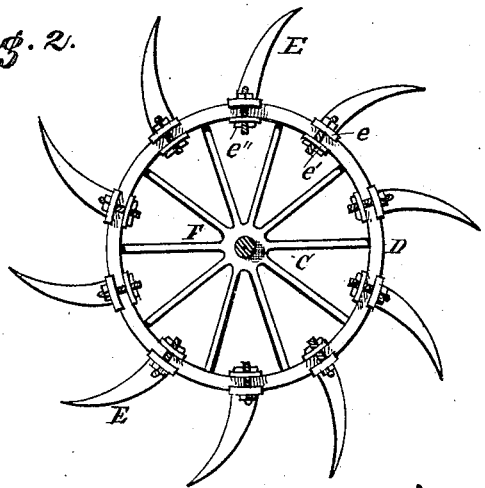
Figure 3:
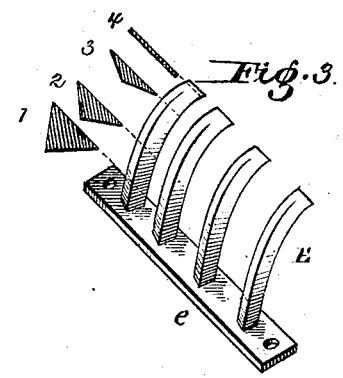

In the drawings, Figure 1 is a plan or top view of a rotary spading-machine constructed according to my invention. Fig. 2 is a sectional view of one of the spade cylinders or drums; and Fig. 3 is a detached perspective view of one of the sets of teeth, showing also enlarged cross-sections of a tooth taken at different points.

The supporting or draft frame A is of a rectangular or other suitable form, and has the customary tongue, B, and a driver's seat. A transverse shaft or axle, C, journaled in boxes at the rear of the frame, carries a drum or cylinder, D, placed at one end of said axle, which has a series of spades or digging-teeth, E, projecting from its periphery. These teeth are arranged across the drum in parallel rows, so that each row will operate like a forked spade, and I preferably have three or four teeth in each row, the spaces between the teeth of each set all coming in line. All of the teeth E of each row are cast on or attached to a back plate, e, which plate rests in a transverse groove on the periphery of the drum, and is bolted through to another plate, e', on the inside of the drum. The plates may be bolted together in the ordinary way; but in place of heads to the bolts I prefer to make a hole transversely through their inner ends for the reception of a wooden break-pin, e''. It necessarily follows that when a spade or tooth encounters an obstruction offering too great a resistance the wooden pin will break, thus causing that set of teeth to become liberated from the drum.

For combining lightness with strength the drum is made hollow with a hub and spokes, F.

The spades or teeth are made with the usual curvature, so that they penetrate the soil to their full length without any displacement of the soil until the periphery of the drum strikes the surface of the ground. The teeth are made with a triangular cross-section, the concave side of the tooth being the base of the triangle, of a uniform width from the point to the base of the tooth, the point being broad and of a chisel shape. The broad side of a tooth is on the concave side, as stated, and hence the spades, in passing through the ground, will raise the soil and turn it over. The thickness of the teeth from front to back, which may be considered the altitude of the triangle forming the cross-section of the tooth, increases from the point to the base, so as to combine the least weight of metal with the maximum of strength.

A ground or traction wheel, H, is secured to the axle or shaft C at the opposite end from the drum D, to support and steady the frame and drum. This traction-wheel runs upon the unplowed or unbroken ground.

A second spading drum or cylinder, G, constructed in every particular like the drum or cylinder D, has its shaft journaled in boxes of a hinged or pivoted frame, I. This frame is loosely hung upon the axle C by means of suitable sleeves or straps, so as to enable its spading-drum to rise and fall, in order that it may adapt itself to the inequalities of the surface of the ground without interfering with the operation of the other spading-drum. The shaft C has a series of toothed wheels, J, mounted thereon, which intermesh with or operate between the series of spades or digging-teeth of the drum or cylinder G, for the purpose of cleaning them from all dirt or clods that may accumulate between them. Another set of cleaners, K, is combined with the spades of the drum or cylinder D. A shaft, L, journaled in one of the side bars of the main frame, and in the extension B' of the tongue, carries said cleaners K. In the present instance the latter are turned by the action of the dirt or clods lodged between the spades of the drum D, it being obvious that, by reason of the position of said cleaners, any obstruction between the spades will cause the cleaners to bear or press against the same and dislodge it. I may, however, if desired, operate the shaft of the cleaners K from the main shaft C through the medium of a train of gear-wheels.

I have in the present instance illustrated only two spading-drums, the frame of the second drum being hung on the axle of the front drum, and made long enough so as to project in rear of the latter. The object of this arrangement is to cause the soil thrown up by the drum G to be thrown in the rear of the first drum, D, and not against it, as would be the case were the two drums mounted upon the same axle.

A third spading-drum, or even a greater number, may be arranged upon the same main frame, the supporting frames or arms of each drum being always made sufficiently long so as to throw the various drums out of line with each other.

The attachment of the frame of the second and third sets of drums to the axle C is of such a nature that they can be easily removed when it is desired to use but one drum—as, for instance, when the machine is used as a cultivator between drills. Each drum is made comparatively narrow—about the width of an ordinary spading-fork—and the bearing-wheel H is necessary to support and steady the drum D. When all the drums are used it is still necessary, as all but the first are only hung to the shaft, and do not support it.

I am fully aware that revolving drums armed with spading-teeth have been employed for ploughing up the ground, and that revolving cleaners have been combined therewith. I do not, therefore, claim them, broadly, but confine myself to the special construction and combination of parts herein described, whereby I am enabled to produce a machine which is far superior to others of the same class, as I combine simplicity of construction with certainty and effectiveness of operation, doing away with all unnecessary devices or complicated parts.

What I claim as new, and desire to secure by Letters Patent, is—

1. In a rotary spading-machine, the combination of the supporting and draft frame A, transverse axle C, the rotary spading-drum D, mounted at one end of said axle, and the traction-wheel H at the opposite end thereof, all as and for the purpose set forth.

2. In a rotary spading-machine, the combination of the supporting and draft frame A, transverse axle C, the rotary spading-drum D, mounted at one end of said axle, the traction-wheel H at the opposite end thereof, with the spading-drum G, hinged frame I, cleaners J, mounted on axle C, and the cleaners K, all constructed and relatively arranged as herein shown and described, for the purpose set forth.

3. In a rotary spading-machine, the curved tooth E, having a square chisel-point and a triangular cross-section, the concave face being of uniform width, and the thickness of the tooth increasing from the point of the base, as and for the purpose set forth.

In testimony whereof I affix my signature in presence of two witnesses.

JULIUS SCHUCHARD.

Witnesses:
 A. M. LONG,
 STORY B. LADD.